US010339153B2

(12) United States Patent
Kurian et al.

(10) Patent No.: US 10,339,153 B2
(45) Date of Patent: Jul. 2, 2019

(54) UNIFORMLY ACCESSING FEDERATED USER REGISTRY TOPOLOGIES

(71) Applicant: International Business Machines Corporation, Armonk, NY (US)

(72) Inventors: John Kurian, Bangalore (IN); Sunil Mathew George, Gold Coast (AU); Rohan S. Zunzarrao, Pune (IN)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 15/096,316

(22) Filed: Apr. 12, 2016

(65) Prior Publication Data

US 2017/0295184 A1    Oct. 12, 2017

(51) Int. Cl.
*G06F 16/25* (2019.01)
*H04L 29/06* (2006.01)

(52) U.S. Cl.
CPC ............ *G06F 16/258* (2019.01); *H04L 63/10* (2013.01)

(58) Field of Classification Search
CPC .................................................. H04L 63/102
See application file for complete search history.

(56) References Cited

U.S. PATENT DOCUMENTS

| | | | |
|---|---|---|---|
| 5,970,490 A * | 10/1999 | Morgenstern | G06F 17/30569 |
| 6,236,997 B1 * | 5/2001 | Bodamer | G06F 17/30569 |
| 8,789,157 B2 | 7/2014 | Sinn | |
| 9,027,093 B2 | 5/2015 | Hinton et al. | |
| 2011/0282969 A1 * | 11/2011 | Iyer | G06F 17/3056 709/217 |
| 2012/0011578 A1 | 1/2012 | Hinton et al. | |
| 2014/0075501 A1 | 3/2014 | Srinivasan et al. | |
| 2015/0089619 A1 | 3/2015 | Manza et al. | |
| 2016/0342645 A1 * | 11/2016 | Tempero | G06F 17/30569 |

OTHER PUBLICATIONS

Kurian et al., "Uniformly Accessing Federated User Registry Topologies", U.S. Appl. No. 15/659,660, filed Jul. 26, 2017, 25 pages.
IBM Appendix P, list of patents or patent applications treated as related, Jul. 24, 2017, 2 pages.
(Continued)

*Primary Examiner* — Simon P Kanaan
(74) *Attorney, Agent, or Firm* — Gilbert Harmon, Jr.

(57) ABSTRACT

An approach for standardizing access to user registries, the approach involving providing a first schema extension to an identity management system and a bridge component to an identity management application wherein the bridge component comprises a second schema extension to the identity management application, receiving a request in a first data format associated with the identity management system, converting the request into a second data format associated with the identity management application and executing the request in the identity management application, receiving a response to the request in the second data format, converting the response into the first data format and returning the response to an end user via the identity management system.

15 Claims, 4 Drawing Sheets

(56) References Cited

OTHER PUBLICATIONS

Drake et al., "Simple Cloud Identity Management: Protocol 1.0", Dec. 14, 2011, <http://www.simplecloud.info/specs/draft-scim-api-00.html>, 23 pages.

Drake et al., "System for Cross-Domain Identity Management:Protocol 1.1", Jul. 9, 2012, <http://www.simplecloud.info/specs/draft-scim-api-01.html>, 24 pages.

Mell et al., "The NIST Definition of Cloud Computing", NIST, National Institute of Standards and Technology, U.S. Department of Commerce, Special Publication 800-145, Sep. 2011, 7 pages.

Mortimer et al., "System for Cross-Domain Identity Management: Core Schema 1.1", Jul. 9, 2012, <http://www.simplecloud.info/specs/draft-scim-core-schema-01.html>, 21 pages.

"WAS Liberty V8.5.5.8 with Java EE 7 Full Platform", IBM WebSphere Liberty Repository, WASdev, Released: Dec. 11, 2015, Grace Period Disclosure, <https://developer.ibm.com/wasdev/downloads/#asset/runtimes-8.5.5-wlp-javaee7>, 2 pages.

* cited by examiner

UNIFORMLY ACCESSING FEDERATED USER REGISTRY TOPOLOGIES

The following disclosure(s) are submitted under 35 U.S.C. 102(b)(1)(A):

(i) Incorporated into International Business Machines Corporations' WAS Liberty V8.5.5.8 with Java EE 7 Full Platform, released on Dec. 11, 2015.

BACKGROUND

The present invention relates generally to the field of user registries, and more particularly to repositories of user registries.

User registries are collections of information about individuals and groups that can be used to perform security related functions, such as authorization or authentication over the internet or an intranet. Information stored in user registries can include user ID's, passwords and profile information, for example, and can be used for functions such as single sign-on where a user only has to authenticate with one user ID and password to access multiple independent software services. A repository of user registries is a software program designed to access and utilize multiple separate user registries for managing user and/or group information and performing security related functions. A repository of user registries can further provide a consolidated view of this user and/or group information from the multiple separate user registries.

SUMMARY

According to one embodiment of the present invention, a method for standardizing access to user registries is provided, the method comprising providing a first schema extension to an identity management system and a bridge component to an identity management application, wherein the bridge component comprises a second schema extension to the identity management application; receiving a request in a first data format associated with the identity management system; converting the request into a second data format associated with the identity management application and executing the request in the identity management application; receiving a response to the request in the second data format; converting the response into the first data format; and returning the response via the identity management system. A corresponding computer program product and computer system are also disclosed herein.

DETAILED DESCRIPTION

Embodiments of the present invention recognize that enterprises moving to a cloud computing environment need a way to migrate identity management applications making use of one or more established user registries where individual and group data is stored. One such example of an identity management application, sometimes referred to as a "federated repository" of user registries, is Virtual Member Manager (VMM) by International Business Machines Corporation, which is a program for communicating with one or more user registries, storing user and group information, presenting a consolidated view of said information and enabling an end user to perform identity management and/or security related functions (e.g., adding, editing and/or deleting profile information, authentication, etc.). It should be noted that an identity management application such as, but not limited to VMM, capable of communicating with one or more user registries can herein be referred to as a repository of user registries. Some examples of the one or more user registries can be, but are not limited to, a Lightweight Directory Access Protocol (LDAP) registry, a database registry, an operating system (OS) registry and/or another stand-alone custom registry.

Rather than having to create new user registries when moving to a cloud platform, solutions provided by embodiments of the present invention provide a means for enterprises to integrate their established identity management applications (i.e., legacy applications) and user registries onto the cloud, thus reusing existing setups associated with the legacy applications and conserving the investments made associated with the creation and building of those legacy applications.

System for Cross-domain Identity Management (SCIM) is an example of an identity management system for managing user identity information in a cloud computing environment and is compatible with different cloud platforms from separate vendors (e.g., International Business Machines Corp., Oracle Corp., Microsoft Corp., etc.). Embodiments of the present invention provide a means for identity management applications to interface seamlessly with an identity management system such as, but not limited to SCIM, to facilitate a migration onto a cloud computing environment. By enabling the use of identity management applications through an identity management system, enterprises can be spared the task of writing program code instructions to have their applications interface with unique, proprietary application programming interfaces (APIs) provided by cloud platform vendors, making the applications therefore portable across different cloud platforms through solutions provided herein by embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
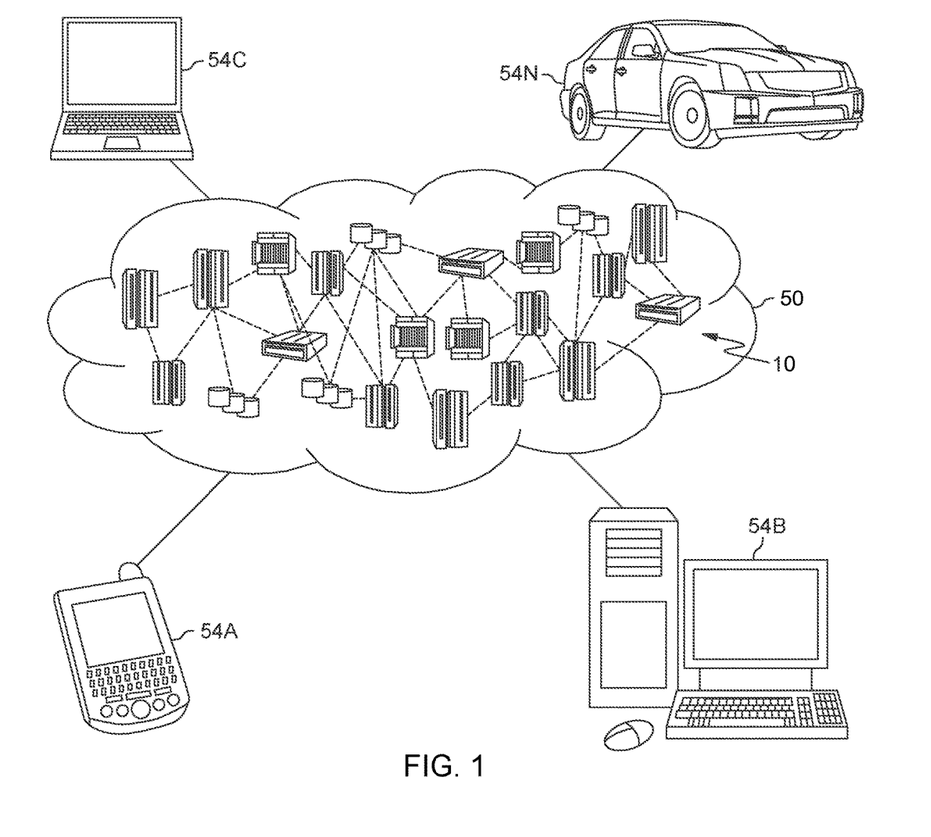
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2A:
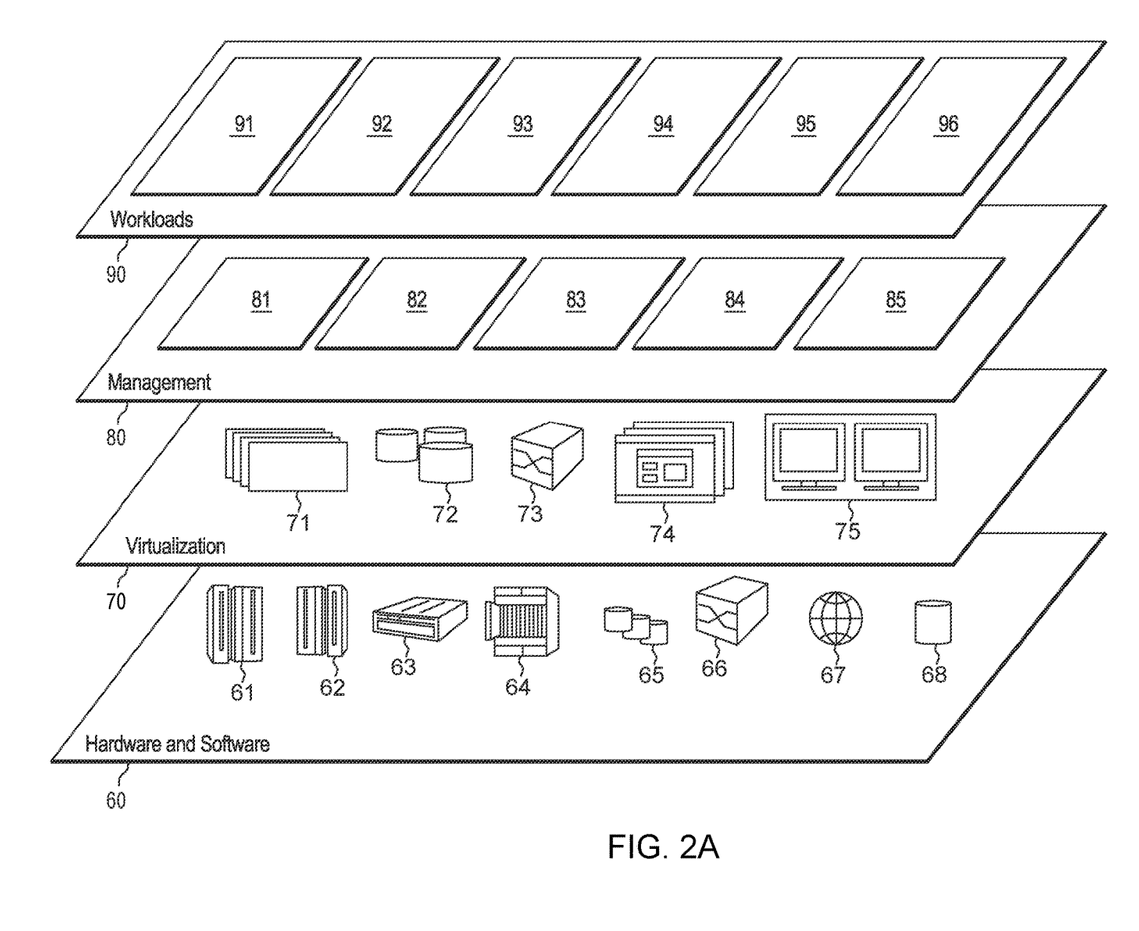
FIG. 2A-C depicts abstraction model layers, a block diagram depicting components of an identity management application and a block diagram depicting components of an identity management layer, respectively, in accordance with an embodiment of the present invention.

Referring now to FIG. 2A, a set of functional abstraction layers provided by cloud computing environment 50 (FIG. 1) is shown. It should be understood in advance that the components, layers, and functions shown in FIG. 2A are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68 which can be an identity management application (e.g., VMM). It should be noted that the term "database software 68" can herein be used interchangeably with "identity management application 68".

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and identity management layer 96.

Figure 2B:
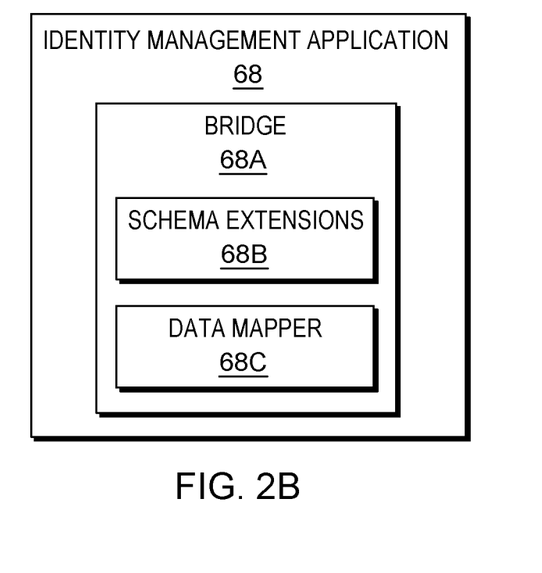

FIG. 2B is a functional block diagram depicting components of identity management application 68, in accordance with an embodiment of the present invention. Identity management application 68 comprises bridge 68A which can delegate calls to and receive responses from one or more user registries as well as allow user registries to connect to identity management application 68 dynamically at runtime. Bridge 68A comprises schema extensions 68B which can, for example, extend the schema of identity management application 68 to enable additional properties to be added to user and/or group data within identity management application 68, but are not limited exclusively to this function. Bridge 68A further comprises data mapper 68C which can, for example, map data, such as, but not limited to data received from a request submitted by an end user, into the appropriate data fields in the one or more user registries communicating with identity management application 68.

Figure 2C:
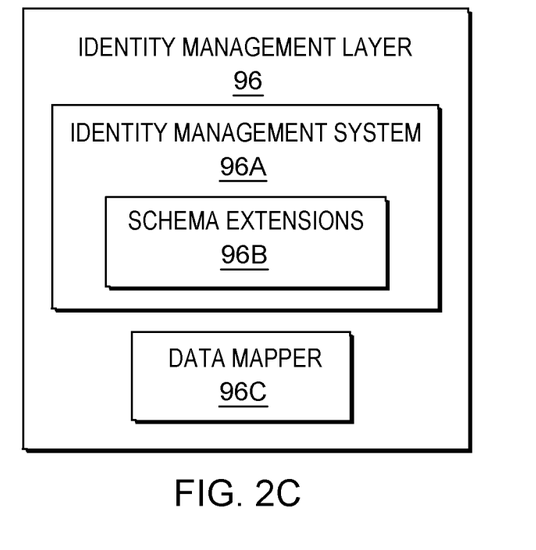

FIG. 2C is a functional block diagram illustrating components of identity management layer 96, in accordance with an embodiment of the present invention. Identity management layer 96 comprises identity management system 96A and data mapper 96 C, wherein identity management system 96A further comprises schema extensions 96B. Identity management layer 96 is a programming layer configured to convert a request submitted through an API provided by identity management system 96A into a data format compatible with an API provided by identity management application 68 (not shown) and vice versa for data being returned responsive to the request. Identity management layer 96 can further input converted data, such as, but not limited to, a request made by an end user through identity management system 96A, into the appropriate data entry fields in identity management application 68 via data mapper 96C and execute the converted request in identity management application 68.

Figure 3:
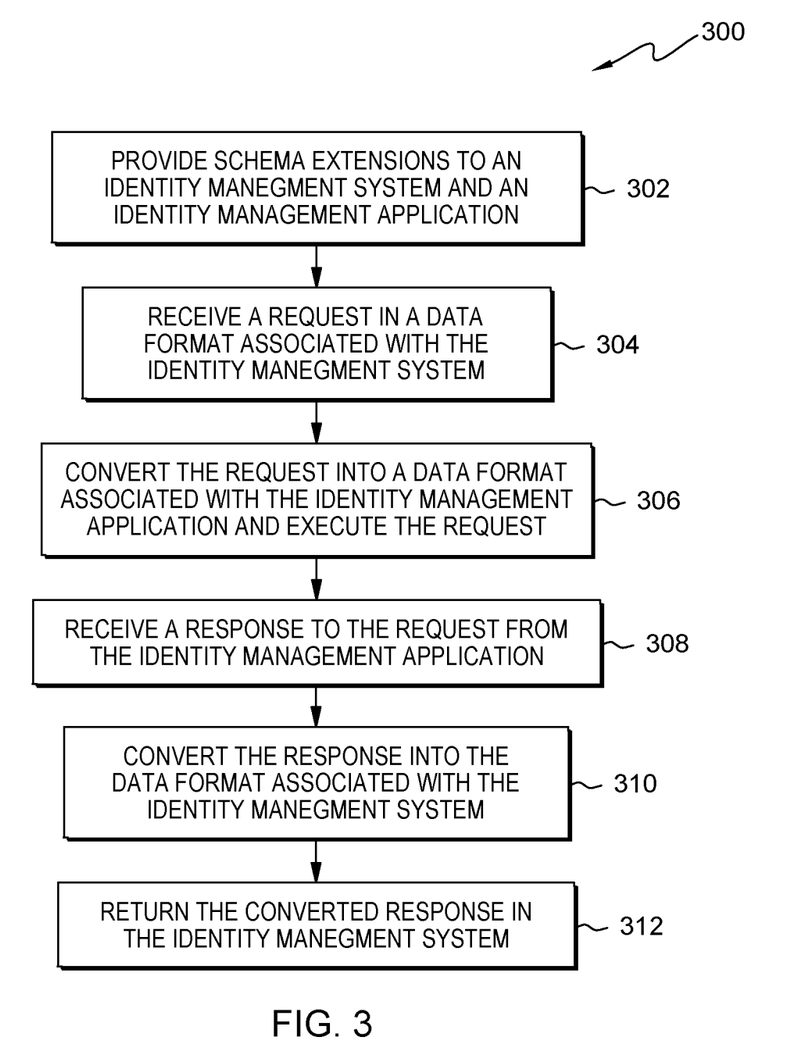
FIG. 3 is a flowchart illustrating operational steps of the identity management layer within the data processing environment of FIG. 1, in accordance with an embodiment of the present invention.

FIG. 3 is a flowchart 300 depicting operational steps of identity management layer 96, in accordance with an embodiment of the present invention. The identity management layer 96, at block 302, provides schema extensions 96B to identity management system 96A. Additionally, bridge 68A provides schema extensions 68B to identity management application 68. Schema extensions 68B and 96B provide a means for customized data handling that augments the functionality of schemas provided by the respective programs. It should be noted that the term "schema" as it is used herein refers to an organizational structure of data e.g., such as within identity management system 96A, identity management application 68, a database, etc.

Schema extensions 96B can, for example, provide the capability for end users to input requests (e.g., via custom data entry fields added to the API) in identity management system 96A that are directed specifically to one or more particular user registries which identity management application 68 (e.g., a repository of user registries) can communicate with. It should be noted that identity management system 96A alone may not be repository aware, i.e., configured to handle specific requests made to one or more user registries (i.e., a subset of user registries) in a group of user registries, thus schema extensions 96B, provided by embodiments of the present invention, enable this capability.

Schema extensions 68B can, for example, provide a means to add additional properties to user and group data within identity management application 68, which can utilize data mapper 68C to map those additional properties (or existing properties) into the one or more user registries communicating with identity management application 68, wherein the properties comprise information associated with users and/or groups. Information associated with users and/or groups can be for example, but is not limited to, names, personal information, user IDs, addresses and phone numbers, etc.

Additionally, schema extensions 68B can enable custom configurations of the one or more user registries communicating with the repository. As an illustrative example, schema extensions 68B can extend the schema of identity management application 68 to enable end users to store data in an unused field in an LDAP user registry, and/or enable the creation of additional data fields in the LDAP user registry which the additional and/or existing properties can be placed into. It should be understood that embodiments of the present invention can provide a user interface for the manual configuration by end users of settings related to any schema extensions and/or data mapping functionality described herein.

Identity management system 96A, at block 304, receives a request from an end user in a first data format (e.g., SCIM provides representational state transfer (REST) APIs which handle data in the JavaScript Object Notation (JSON) data format). The request can comprise, for example, but is not limited to, a request for authentication, a request for a retrieval of individual user and/or group data or a request for the editing of individual user and/or group data which can include a custom configuring of one or more user registries as previously discussed. Identity management layer 96 converts, at block 306, the request in the first data format into a second data format that is compatible with an API provided by identity management application 68 and executes the converted request in the identity management application 68. The data conversion at block 306 can comprise data mapping (handled by data mapper 96C) that relies on knowledge of the schema of identity management application 68. For example, portions of data (e.g., user names, user ID numbers, passwords, etc.) can be extracted from the request made in the first data format and appropriately inserted into the respective data entry fields in identity management application 68.

Identity management layer 96 receives, at block 308, a response to the request in the second data format wherein the response is returned through identity management application 68 from the one or more user registries communicating with it. It should be understood that the data comprising the response can originate from one or more of the user registries communicating with the repository depending on the nature of the request, e.g., how specifically directed or general the request was. Identity management layer 96, at block 310, can convert the response in the second data format into the first data format compatible with the identity management system 96A and return the response to the end user at block 312 through identity management system 96A. The data conversion associated with the response, occurring at block 310, can also involve a mapping of data as previously discussed.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for standardizing identity management applications to interface seamlessly with an identity management system to facilitate a migration onto a cloud computing environment, the computer-implemented method comprising:
   providing, by one or more processors, a first schema extension to an identity management system and a bridge component to an identity management application, wherein the bridge component delegates calls to and receives responses from one or more user registries and allows user registries to connect to the identity management application dynamically at run-time, and comprises a second schema extension to the identity management application, wherein the second schema extension extends a schema of the identity management application to enable one or more users to store data in unused fields in a Lightweight Directory Access Protocol (LDAP) user registry, and to enable the creation of additional data fields in the LDAP user registry wherein newly created and existing properties can be stored;
   receiving, by the one or more processors, a request from an end user in a first data format associated with the identity management system;
   converting, by the one or more processors, the request from the first data format into a second data format associated with the identity management application and compatible with an application programming interface (API) provided by the identity management application;
   sending, by the one or more processors, the request in the second data format to the identity management application, through the API, for execution;
   receiving, by the one or more processors, a response in the second data format from the identity management application to the request in the second data format;
   converting, by the one or more processors, the response from the second data format into the first data format that is compatible with the identity management system, wherein the converted data is input into appropriate data entry fields in the identity management application via a data mapper and executing the converted request in the identity management application, wherein the converted data comprises a request made by the one or more end users through the identity management system enabling the identity management applications to interface seamlessly with the identity management system to facilitate a migration onto a cloud computing environment by enabling the use of identity management applications through the identity management system, without writing program code instructions for applications to interface with APIs provided by cloud platform vendors, making the applications portable across different cloud platforms; and
   returning, by the one or more processors, the converted data enabling applications to be portable across different cloud platforms associated with the response via the identity management system.

2. The computer-implemented method of claim 1, wherein converting the request comprises mapping data into an application programming interface provided by the identity management application.

3. The computer-implemented method of claim 1, wherein standardizing access to user registries is provided as a service in a cloud environment.

4. A computer program product for standardizing identity management applications to interface seamlessly with an identity management system to facilitate a migration onto a cloud computing environment, the computer program product comprising:
   one or more computer readable storage media and program instructions stored on the one or more computer readable storage media, the program instructions comprising:
      program instructions to provide a first schema extension to an identity management system and a bridge component to an identity management application, wherein the bridge component delegates calls to and receives responses from one or more user registries and allows user registries to connect to the identity management application dynamically at run-time, and comprises a second schema extension to the identity management application, wherein the second schema extension extends a schema of the identity management application to enable one or more users to store data in unused fields in a Lightweight Directory Access Protocol (LDAP) user registry, and to enable the creation of additional data fields in the LDAP user registry wherein newly created and existing properties can be stored;
      program instructions to receive a request in a first data format associated with the identity management system;
      program instructions to convert the request from the first data format into a second data format associated with the identity management application and is compatible with an application programming interfaces (APIs) provided by the identity management application;
      program instructions to send the request in the second data format to the identity management application, through the API, for execution;
      program instructions to receive a response in the second data format from the identity management application to the request in the second data format;
      program instructions to convert the response from the second data format into the first data format that is compatible with the identity management system, wherein the converted data is input into appropriate data entry fields in the identity management application via a data mapper and program instructions to execute the converted request in the identity management application, wherein the converted data comprises a request made by the one or more end users through the identity management system enabling the identity management applications to interface seamlessly with the identity management system to facilitate a migration onto a cloud computing environment by enabling the use of identity management applications through the identity management system, without writing program code instructions for applications to interface with APIs provided by cloud platform vendors, making the applications portable across different cloud platforms; and program instructions to return the converted data enabling applications to be portable across different cloud platforms associated with the response via the identity management system.

5. The computer program product of claim 4, wherein the program instructions to convert the request comprise mapping data into an application programming interface provided by the identity management application.

6. The computer program product of claim 4, wherein standardizing access to user registries is provided as a service in a cloud environment.

7. A computer system for standardizing access to user registries, the computer system comprising:
one or more computer processors;
one or more computer readable storage media;
program instructions stored on the one or more computer readable storage media for execution by at least one of the one or more processors, the program instructions comprising:
program instructions to provide a first schema extension to an identity management system and a bridge component to an identity management application, wherein the bridge component delegates calls to and receive responses from one or more user registries and allows user registries to connect to the identity management application dynamically at run-time, and comprises a second schema extension to the identity management application, wherein the second schema extension extends a schema of the identity management application to enable one or more users to store data in unused fields in a Lightweight Directory Access Protocol (LDAP) user registry, and to enable the creation of additional data fields in the LDAP user registry wherein newly created and existing properties can be stored;
program instructions to receive a request in a first data format associated with the identity management system;
program instructions to convert the request from the first data format into a second data format associated with the identity management application and is compatible with an application programming interfaces (APIs) provided by the identity management application;
program instructions to send the request in the second data format to the identity management application, through the API, for execution;
program instructions to receive a response in the second data format from the identity management application to the request in the second data format;
program instructions to convert the response from the second data format into the first data format that is compatible with the identity management system, wherein the converted data is input into appropriate data entry fields in the identity management application via a data mapper and program instructions to execute the converted request in the identity management application, wherein the converted data comprises a request made by the one or more end users through the identity management system enabling the identity management applications to interface seamlessly with the identity management system to facilitate a migration onto a cloud computing environment by enabling the use of identity management applications through the identity management system, without writing program code instructions for applications to interface with APIs provided by cloud platform vendors, making the applications portable across different cloud platforms; and program instructions to return the converted data enabling applications to be portable across different cloud platforms associated with the response via the identity management system.

8. The computer system of claim 7, wherein the program instructions to convert the request comprise mapping data into an application programming interface provided by the identity management application.

9. The computer system of claim 7, wherein standardizing access to user registries is provided as a service in a cloud environment.

10. The computer-implemented method of claim 1, wherein the identity management application is a repository for communicating with one or more user registries, the first schema extension enables the one or more end users to submit a request in the identity management system which is directed to a subset of the one or more user registries, and the second schema extension enables a custom configuration of the one or more user registries and additional properties to be added to a user data and a group data associated with the identity management application.

11. The computer program product of claim 4, wherein the identity management application is a repository for communicating with one or more user registries, the first schema extension enables the one or more end users to submit a request in the identity management system which is directed to a subset of the one or more user registries, and the second schema extension enables a custom configuration of the one or more user registries and additional properties to be added to a user data and a group data associated with the identity management application.

12. The computer system of claim 7, wherein the identity management application is a repository for communicating with one or more user registries, the first schema extension enables the one or more end users to submit a request in the identity management system which is directed to a subset of the one or more user registries, and the second schema extension enables a custom configuration of the one or more user registries and additional properties to be added to a user data and a group data associated with the identity management application.

13. The computer-implemented method of claim 1, wherein the request comprises: a request for authentication, a request for a retrieval of individual user data and group data, and a request to edit the individual user data and the individual group data.

14. The computer program product of claim 4, wherein the request comprises: a request for authentication, a request for a retrieval of individual user data and group data, and a request to edit the individual user data and the individual group data.

15. The computer system of claim 7, wherein the request comprises: a request for authentication, a request for a retrieval of individual user data and group data, and a request to edit the individual user data and the individual group data.

* * * * *